UNITED STATES PATENT OFFICE.

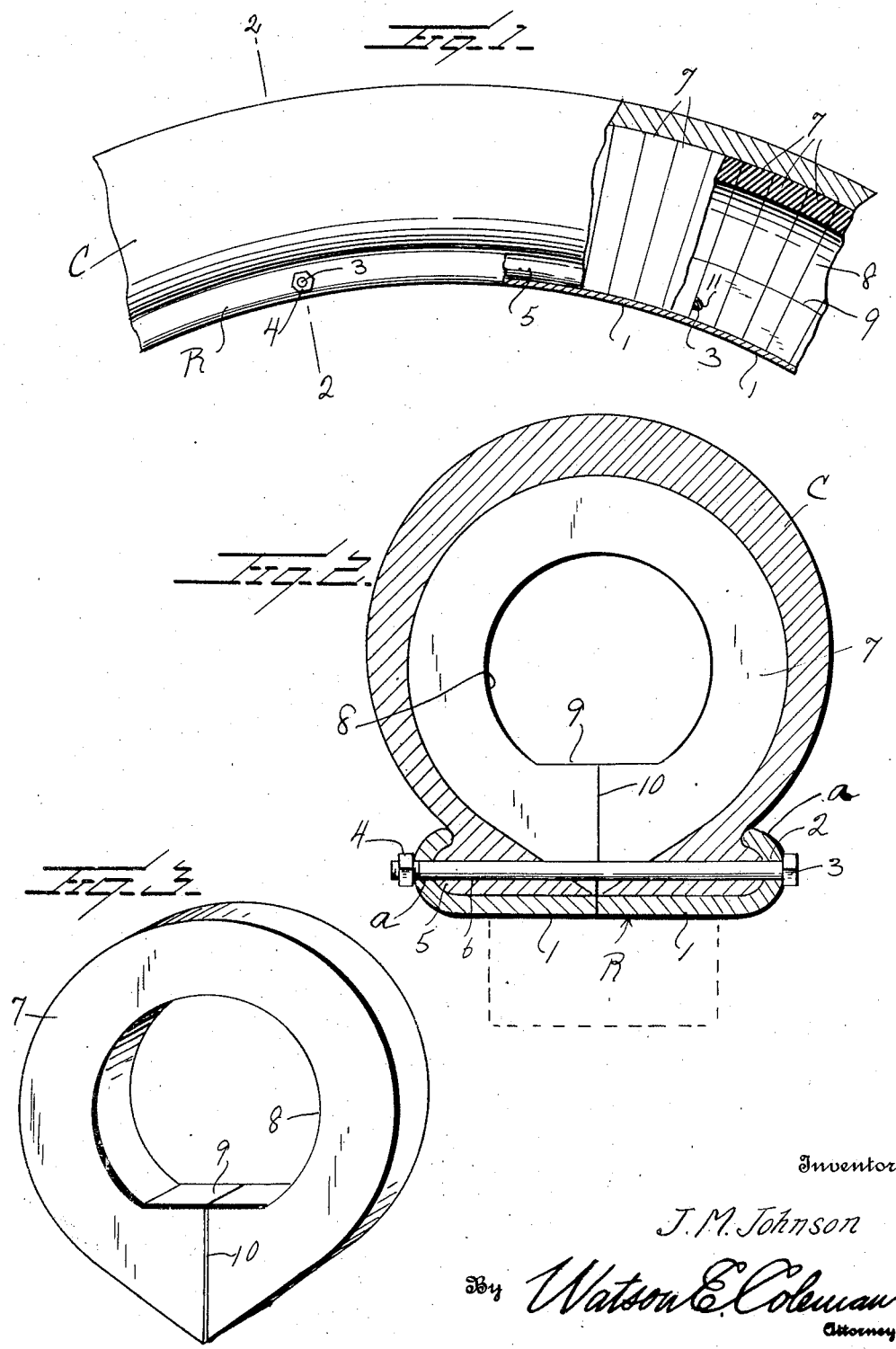

JOSEPH M. JOHNSON, OF HARRISBURG, PENNSYLVANIA.

TIRE.

1,361,065.    Specification of Letters Patent.    Patented Dec. 7, 1920.

Application filed May 22, 1920. Serial No. 383,439.

*To all whom it may concern:*

Be it known that I, JOSEPH M. JOHNSON, a citizen of the United States, residing at Harrisburg, in the county of Dauphin and State of Pennsylvania, have invented certain new and useful Improvements in Tires, of which the following is a specification, reference being had to the accompanying drawings.

This invenion relates to certain improvements in tires and it is an object of the invention to provide a tire with novel and improved means whereby the same is maintained in desired configuration with the necessary resiliency without requiring inflation.

Another object of the invention is to provide a tire embodying a novel and improved core, preferably formed in sections, and which serves to maintain the casing in the proper form.

An additional object of the invention is to provide a tire with a novel and improved core provided therethrough in a direction circumferentially of the tire with an opening to increase the requisite resiliency of the core and wherein such opening is of such cross sectional form to prevent the assembled tire from having undue lateral movement which would be liable to separate such tire from the coacting wall structure.

The invention consists in the details of construction and in the combination and arrangement of the several parts of the improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in elevation and partly in section illustrating a tire constructed in accordance with an embodiment of my invention.

Fig. 2 is an enlarged fragmentary sectional view taken substantially on the line 2—2 of Fig. 1, and Fig. 3 is a view in perspective of one of the disks comprised in the core as herein disclosed, unapplied.

As disclosed in the accompanying drawings, R denotes a rim adapted to be mounted in a well known manner upon the felly of a wheel structure and the rim R is split circumferentially and at substantially its transverse center into two lateral sections 1, each movable one with respect to the other. The clencher flanges $a$ of the sections at desired points around the rim R are provided with the transversely alined openings 2 and through each set of openings is disposed a bolt 3 and which bolt has coacting therewith a clamping nut 4.

C denotes the casing or carcass of a tire coacting in the well known manner with the rim R and the beads 5 of said casing or carcass are provided with the openings 6 through which the bolts 3 are also disposed.

7 designates a plurality of disks preferably of elastic or resilient material and which snugly fits within the casing or carcass C. The inner portion of each of the disks 7 is substantially in the form of a V and when the disk is applied, the apex part of the inner portion is adapted to have direct contact with the outer face or periphery of the rim R.

Each of the disks 7 has disposed therethrough a relatively large opening 8 of a configuration preferably in excess of a semicircle with the inner wall 9 of said opening chordal so that the inner portion of the disk 7 is materially strengthened or reinforced to prevent the assembled tire from having undue lateral movement which would otherwise have a tendency to result in a separation of the casing or carcass C from the rim R.

In practice, the disks 7 are applied within the casing or carcass C in sufficient number to entirely fill the interior of said casing or carcass with adjacent disks 7 in contact one with the other. The filled casing or carcass C is then applied to the rim R with the sections 1 thereof spaced apart, after which each of the bolts 3 or the coacting nut 4 is adjusted in a manner as to move the sections 1 one toward the other, resulting in the disks 7 snugly fitting within the assembled casing or carcass C and in a manner whereby the assembled tire is under sufficient tension to meet with the requirements of practice.

I also find it of especial advantage to have the inner portion of each of the disks 7 split as at 10 on a line substantially radial to the center of the opening 8 and extending through the apex of the inner portion of the disk 7. By this means, a shim or other filler may be positioned between the resultant ends of the disks 7 in the event it should be desired to transversely enlarge said disks to further insure the requisite fitting of the disks within the casing or carcass C or to compensate for wear which may have been imposed upon said disks.

The inner portion of a disk 7 adjacent each of the bolts 3 is cut away as at 11 to facilitate the desired application of said bolt.

From the foregoing description it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In combination with the carcass of a tire, a plurality of cushioning disks within said carcass, each of said disks having an opening therethrough, the outer portion of the wall of said opening being arcuate and the inner wall of said opening being flat and chordal with respect to the remaining portion of the wall of the opening, the flat inner wall of the opening being arranged inwardly of the axial center of the arcuate portion of the wall, the inner portion of said disk being substantially in the form of a V.

In testimony whereof I hereunto affix my signature.

JOSEPH M. JOHNSON.